United States Patent
Teo et al.

(10) Patent No.: US 11,232,811 B2
(45) Date of Patent: Jan. 25, 2022

(54) OFFSET SWAGE BASEPLATE FOR STACKED ASSEMBLY

(71) Applicant: Western Digital Technologies, Inc., San Jose, CA (US)

(72) Inventors: Kia Moh Teo, San Jose, CA (US); Yanning Liu, San Jose, CA (US); Hiroyasu Tsuchida, Fujisawa (JP); Kathryn Tao, Scotts Valley, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/801,921

(22) Filed: Feb. 26, 2020

(65) Prior Publication Data
US 2021/0264941 A1 Aug. 26, 2021

(51) Int. Cl.
G11B 5/48 (2006.01)
G11B 5/596 (2006.01)

(52) U.S. Cl.
CPC .......... G11B 5/4826 (2013.01); G11B 5/4833 (2013.01); G11B 5/596 (2013.01)

(58) Field of Classification Search
CPC ...... G11B 5/4826; G11B 5/596; G11B 5/4833
USPC .......................... 360/245.1–245.6, 244–244.7
See application file for complete search history.

(56) References Cited

U.S. PATENT DOCUMENTS

| 5,099,373 | A | * | 3/1992 | Shibata | G11B 5/4886 |
| | | | | | 360/244.5 |
| 5,262,911 | A | * | 11/1993 | Cain | G11B 5/5521 |
| | | | | | 29/603.03 |
| 5,381,289 | A | * | 1/1995 | Fiedler | G11B 5/4813 |
| | | | | | 360/244.2 |
| 6,031,688 | A | * | 2/2000 | Summers | G11B 5/4806 |
| | | | | | 360/244.6 |
| 6,063,508 | A | | 5/2000 | Hanrahan et al. | |
| 6,339,179 | B1 | | 1/2002 | Schulz et al. | |
| 6,388,841 | B1 | * | 5/2002 | Summers | G11B 5/4806 |
| | | | | | 360/244.5 |

(Continued)

OTHER PUBLICATIONS

Bamrungwongtaree, Joompondej et al., Improvement of Boss Tower for Single Ball Swaging in Hard Disk Drive, International Journal of Scientific and Research Publications, Nov. 2012, pp. 1-9, vol. 2, Issue 11, jsrp.org, downloaded from http://www.ijsrp.org/research-paper-1112/ijsrp-p1129.pdf.

*Primary Examiner* — Brian E Miller
(74) *Attorney, Agent, or Firm* — John D. Henkhaus

(57) ABSTRACT

An approach to a head gimbal assembly, such as for a hard disk drive, includes an offset swage plate coupling a suspension to one side of an actuator arm and another offset swage plate coupling another suspension to an opposing second side of the actuator arm. Each offset swage plate includes a main body, a swage through-hole through a first lateral or longitudinal side of the main body, a swage boss around the perimeter of the swage through-hole and extending substantially normal to the main body, and a clearance through-hole through an opposing second lateral or longitudinal side of the main body, the clearance through-hole having no swage boss. Each offset swage plate is configured in the assembly in a position opposing the other, such that the corresponding swage bosses are positioned on different lateral/longitudinal sides of the arm tip so that there is no coaxial swage boss buildup.

12 Claims, 5 Drawing Sheets

(56) References Cited

U.S. PATENT DOCUMENTS

| | | | |
|---|---|---|---|
| 6,697,227 B2* | 2/2004 | Kashima | G11B 5/4826 360/244.6 |
| 8,233,239 B1 | 7/2012 | Teo et al. | |
| 8,804,286 B1 | 8/2014 | Aparimarn et al. | |
| 9,013,833 B2 | 4/2015 | Aparimarn et al. | |
| 9,165,578 B2 | 10/2015 | Dexter et al. | |
| 9,502,057 B1* | 11/2016 | Schreiber | G11B 5/4813 |
| 2002/0051318 A1* | 5/2002 | Kant | G11B 5/4813 360/244.6 |
| 2006/0193085 A1* | 8/2006 | Budde | G11B 5/5552 360/245.3 |

* cited by examiner

SWAGE-COUPLE A FIRST SUSPENSION TO A FIRST SIDE OF AN ACTUATOR ARM VIA A SWAGE BOSS OF A FIRST OFFSET SWAGE PLATE COMPRISING: A SWAGE THROUGH-HOLE THROUGH A FIRST LATERAL HALF OF A MAIN BODY, THE SWAGE BOSS POSITIONED AROUND THE PERIMETER OF THE SWAGE THROUGH-HOLE AND EXTENDING SUBSTANTIALLY NORMAL TO THE MAIN BODY, AND A CLEARANCE HOLE THROUGH AN OPPOSING SECOND LATERAL HALF OF THE MAIN BODY, THE CLEARANCE HOLE HAVING NO SWAGE BOSS
402

↓

SWAGE-COUPLE A SECOND SUSPENSION TO AN OPPOSING SECOND SIDE OF THE ACTUATOR ARM VIA A SWAGE BOSS OF A SECOND OFFSET SWAGE PLATE COMPRISING: A SWAGE THROUGH-HOLE THROUGH A FIRST LATERAL HALF OF A MAIN BODY, THE SWAGE BOSS AROUND THE PERIMETER OF THE SWAGE THROUGH-HOLE AND EXTENDING SUBSTANTIALLY NORMAL TO THE MAIN BODY, AND A CLEARANCE HOLE THROUGH AN OPPOSING SECOND LATERAL HALF OF THE MAIN BODY, THE CLEARANCE HOLE HAVING NO SWAGE BOSS
404

FIG. 4

OFFSET SWAGE BASEPLATE FOR STACKED ASSEMBLY

FIELD OF EMBODIMENTS

Embodiments of the invention may relate generally to a swaged stacked assembly and particularly to an offset swage baseplate for a stacked assembly.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head that is positioned over a specific location of a disk by an actuator. A read-write head makes use of magnetic fields to write data to and read data from the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic disk, which in turn magnetizes a small area on the recording medium.

An HDD includes at least one head gimbal assembly (HGA) that generally includes a slider that houses the read-write transducer (or "head"), and a suspension. Each slider is attached to the free end of a suspension that in turn is cantilevered from the rigid arm of an actuator. Several actuator arms may be combined to form a single movable unit, a head stack assembly (HSA), typically having a rotary pivotal bearing system. The suspension of a conventional HDD typically includes a relatively stiff load beam with a mount plate at its base end, which attaches to the actuator arm, and whose free end mounts a flexure that carries the slider and its read-write head. Positioned between the mount plate and the functional end of the load beam is a "hinge" that is compliant in the vertical bending direction (normal to the disk surface). The hinge enables the load beam to suspend and load the slider and the read-write head toward the spinning disk surface. It is then the function of the flexure to provide gimbaled support for the slider so that the slider can pitch and roll in order to adjust its orientation.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which:

FIG. 4 is a flow diagram illustrating a method of assembling a head gimbal assembly, according to an embodiment.

DESCRIPTION

Approaches to an offset swage baseplate are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of an Illustrative Operating Context

Embodiments may be used in the context of a swaged stacked assembly, such as a head gimbal assembly (HGA) for a hard disk drive (HDD). Thus, in accordance with an embodiment, a plan view illustrating a conventional HDD 100 is shown in FIG. 1 to aid in describing how a conventional HDD typically functions.

Figure 1:
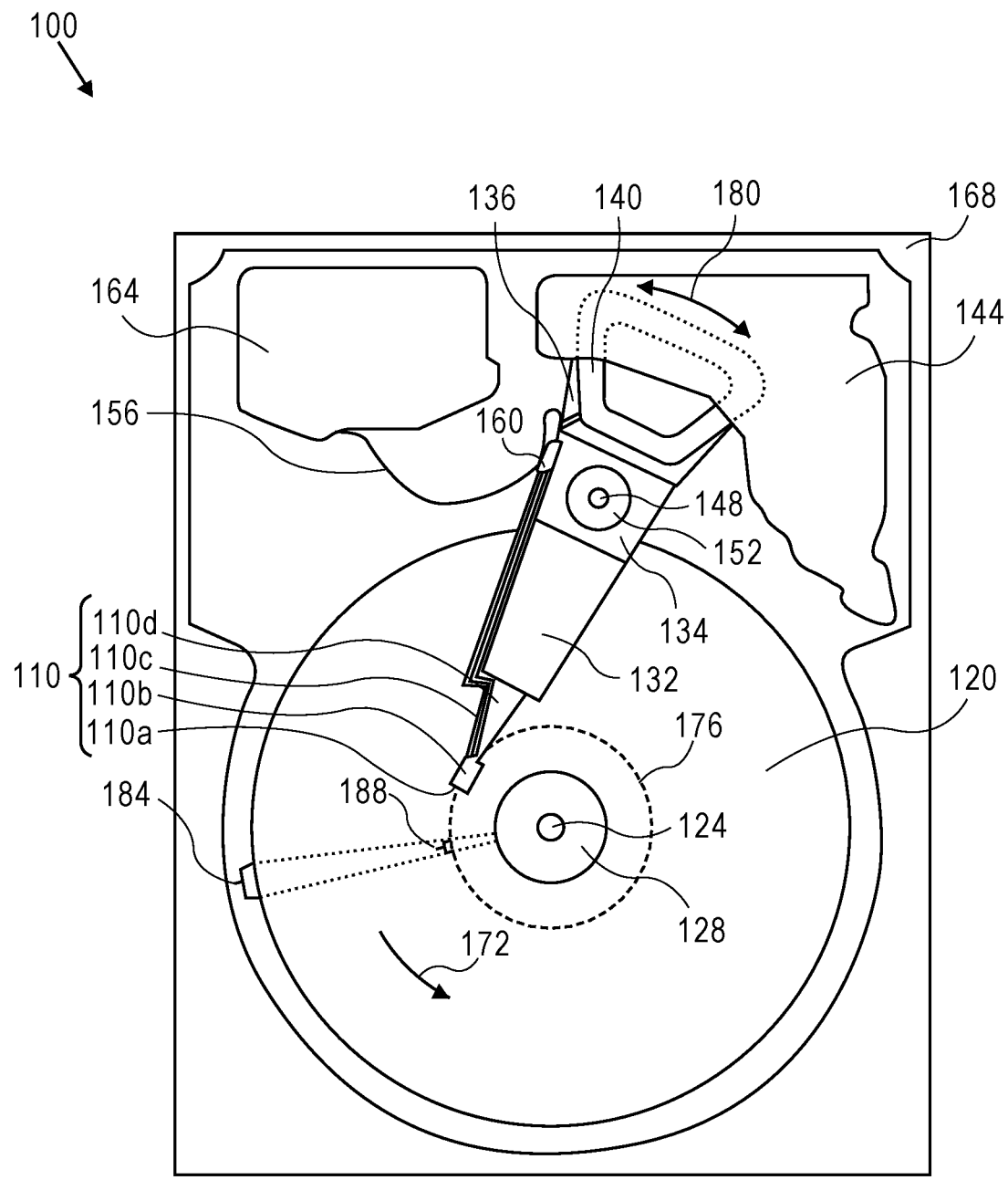
FIG. 1 is a plan view illustrating a hard disk drive, according to an embodiment.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM, or "voice coil actuator") that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM, and a write signal to and a read signal from the head 110a) are transmitted by a flexible cable assembly (FCA) 156 (or "flex cable"), also at times referred to as a flexible printed circuit (FPC). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium or hydrogen for non-limiting examples, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Introduction

References herein to "an embodiment", "one embodiment", and the like, are intended to mean that the particular feature, structure, or characteristic being described is included in at least one embodiment of the invention. However, instance of such phrases do not necessarily all refer to the same embodiment, The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Increasing the storage capacity of hard disk drives (HDDs) is one of the on-going goals of HDD technology evolution. In one form, this goal manifests in increasing the number of disks implemented in a given HDD. However, oftentimes the customer demand requires maintaining a standard form factor, as characterized in part by the z-height of an HDD, which inherently provides challenges with respect to fitting more disks into a given HDD. More particularly, customer specifications and/or common design and operational constraints include operational shock (or "op-shock") requirements, which generally relate to an HDD's operational resistance to or operational tolerance of a mechanical shock event. Recall that the suspension of an HDD typically includes a relatively stiff load beam with a mount plate at its base end, which attaches to the actuator arm, and whose free end mounts a flexure that carries the slider and its read-write head. Thus, it remains a challenge to increase the number of disks while maintaining a standard form factor, which decreases the distance between each disk of the disk stack, while also reliably meeting op-shock requirements. In particular, the limited mechanical clearances associated with the head gimbal assembly (HGA), such as relative to the operational positioning of each suspension as interposed with the disks within the disk stack, pose a challenge to meeting such requirements. Stated otherwise, the less spacing between disks may logically result in lower op-shock performance in the context of a typically configured HGA.

Figure 2A:
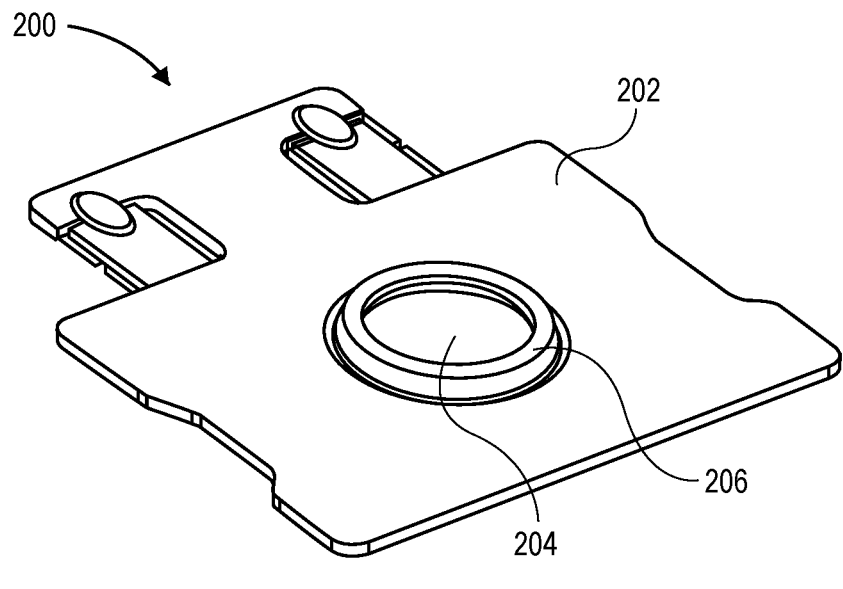
FIG. 2A is a perspective view illustrating a swage plate.
Figure 2B:
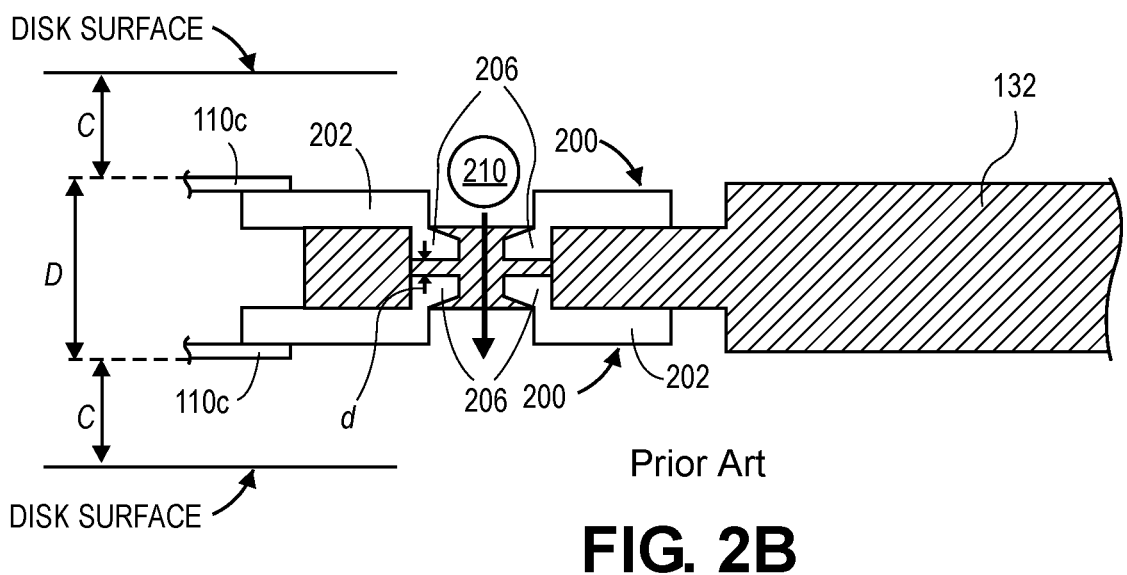
FIG. 2B is a cross-sectional side view illustrating suspension-arm assembly swages utilizing the swage plate of FIG. 2A.

FIG. 2A is a perspective view illustrating a swage plate, and FIG. 2B is a cross-sectional side view illustrating suspension-arm assembly swages utilizing the swage plate of FIG. 2A. Swage plate 200 illustrates what may be considered a typical swage plate used for coupling an HDD suspension to a corresponding actuator arm. Swage plate 200 comprises a main body 202 comprising a swage through-hole 204 therethrough, which is surrounded at its perimeter by a swage boss 206. Typically, the swage plate 200 would have a suspension (such as lead suspension 110c of FIG. 1) welded or otherwise mechanically coupled thereto (as well as electrically coupled thereto), prior to the swaging (or swage-coupling) of the suspension to a corresponding actuator arm (such as arm 132 of FIG. 1). Swaging is a well-known forging process typically enacted by forcing a swage ball 210 through the through-hole 204 to deform or alter the dimensions of the swage boss 206 (e.g., rotary swaging), to cold work the metals to form a bond or inter-coupling of the swage plate 200/suspension 110c sub-component and the arm 132 sub-component. That is, the swage boss 206 is inserted into an aperture in the actuator arm 132 and a swage ball 210, which has a larger diameter than the inner diameter of the swage boss 206, is inserted into the swage through-hole 204 of the swage boss 206 to swage couple the swage boss 206 to the aperture by applying a compressive force to the inner surface of the swage boss 206 such that the swage boss 206 expands to hold the actuator arm to the suspension.

As can be appreciated by the illustration of FIG. 2B, the distance (D) from the outer surface of the "up" suspension (e.g., the lower suspension 110c which interacts with the top or "up" surface of a corresponding disk) and the "down" suspension (e.g., the upper suspension 110c which interacts with the bottom or "down" surface of a corresponding disk) is a driving dimension in regards to the amount of dimensional clearance (C) afforded between each suspension 110c and a corresponding disk surface on which the corresponding read-write transducer operates. This clearance C, therefore, would affect the likelihood that either of the HGAs (or constituent sub-components) might mechanically interact with (e.g., "hit") its corresponding disk surface consequent to a shock event, which could likewise affect the overall op-shock performance of the HDD. Hence, likewise, the distance (d) between the "up" and "down" swage bosses 206 is also a driving dimension in regards to the amount of dimensional clearance C afforded between each suspension 110c and a corresponding disk surface, where such distance d is often driven by a manufacturing dimensional clearance requirement, or tolerance, between the pair of stacked swage bosses 206 (e.g., a swage boss "buildup", because the swage bosses 206 are coaxial). In view of the foregoing and the goal of increasing the number of recording disks in a disk stack, an approach to reducing the distance D between the pair of suspensions swaged to a given actuator arm, while maintaining the necessary clearance C with corresponding disk surfaces, may be desirable.

Approaches to the foregoing space issue may include reducing the arm tip thickness within the constraint allowed by the swage boss buildup, reducing the overall thickness of the stamped swage plate part (but this could likely lead to easy bending due to the lower yield strength post-annealing), and reducing the thickness of the media to allow greater clearance between the media and arm mounting surfaces.

Offset Swage Baseplate

Figure 3A:
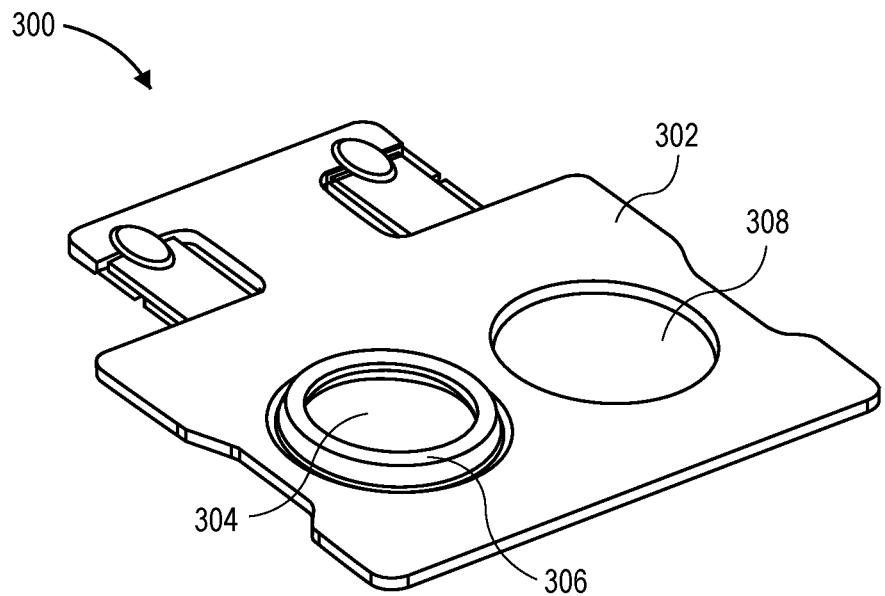
FIG. 3A is a perspective view illustrating an offset swage plate, according to an embodiment.

FIG. 3A is a perspective view illustrating an offset swage plate, according to an embodiment. Offset swage plate 300 illustrates what is referred to herein as an "offset swage plate", which can be used for coupling an HDD suspension to a corresponding actuator arm, according to an embodiment. Offset swage plate 300 (or simply "swage plate") comprises a planar main body 302 comprising a first swage through-hole 304 (or simply "through-hole") through a first lateral half or side of the main body 302, and which is surrounded at its perimeter by a swage boss 306 (e.g., a boss tower) that extends substantially normal to the main body 302. The swage boss 306 has an inner diameter effectively defining an inner surface of the swage through-hole 304, and an outer diameter effectively defining an outer surface of the swage boss 306. An implementation of an offset swage plate 300 may have a suspension (such as lead suspension 110c of FIG. 1) welded or otherwise mechanically coupled thereto (as well as electrically coupled thereto), prior to the swaging (or swage-coupling) of the suspension to a corresponding actuator arm 332. As discussed in reference to FIG. 2A, swaging is a well-known forging process typically enacted by forcing a swage ball through the through-hole 304 to deform or alter the dimensions of the swage boss 306 to cold work the metals to form a bond or inter-coupling of the swage plate 300/suspension 110c sub-component and the arm 332 sub-component.

Unlike swage plate 200 (FIGS. 2A, 2B), and in addition to the first swage through-hole 304 and corresponding swage boss 306 being laterally offset from the centerline of the main body 302, offset swage plate 300 further comprises a second through-hole 308 (or "clearance hole") through a second lateral half or side of the main body 302 opposing the first lateral side, where the second through-hole 308 has no, or is void of, any swage boss. Hence, a pair of swage plates 300 may be used to mount a pair of suspensions to opposing sides of an actuator arm, while reducing the distance D between suspensions as illustrated in FIG. 2B, as described in more detail hereafter.

According to an alternative embodiment, an offset swage plate similar in some aspects to swage plate 300 may comprise the planar main body 302 comprising a first swage through-hole 304 (or simply "through-hole") through a first longitudinal half, side, portion of the main body 302 and which is surrounded at its perimeter by a swage boss 306 (e.g., a boss tower) that extends substantially normal to the main body 302, and further comprises a second through-hole 308 (or "clearance hole") through a second longitudinal half, side, portion of the main body 302 opposing the first longitudinal side, where the second through-hole 308 is void of any swage boss. Hence, here too a pair of offset swage plates may be used to mount a pair of suspensions to opposing sides of an actuator arm, while reducing the distance D between suspensions.

Figure 3B:
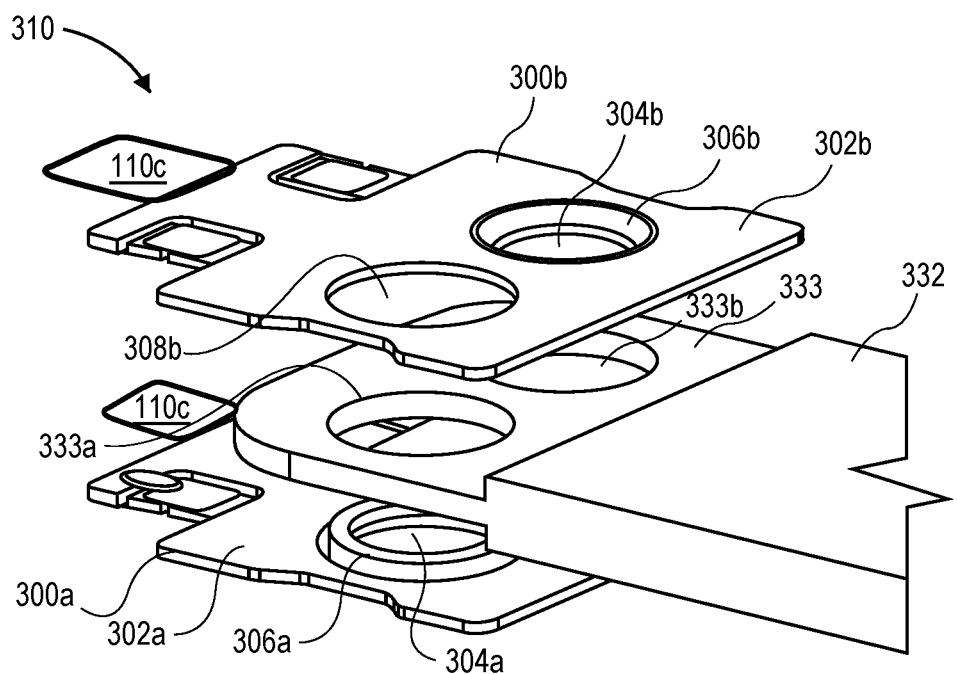
FIG. 3B is an exploded perspective view illustrating a suspension-arm assembly utilizing the offset swage plate of FIG. 3A, according to an embodiment.

FIG. 3B is an exploded perspective view illustrating a suspension-arm assembly utilizing the offset swage plate of FIG. 3A, according to an embodiment. Suspension-arm assembly 310 comprises an arm 332 (or "actuator arm") having an arm tip 333. Assembly 310 further comprises a first offset swage plate 300a coupling a first suspension (such as suspension 110c of FIG. 1), and thus a first head slider housed by the first suspension, to a first side (vertical direction, or z-direction) of the arm 332, and a second offset swage plate 300b coupling a second suspension (such as suspension 110c of FIG. 1), and thus a second head slider housed by the second suspension, to a second side (z-direction) of the arm 332 opposing the first side. While which swage plate 300/arm 332 assembly is referred to as the "first" and the "second" is arbitrary, for the purposes of explanation the "first" assembly refers herein to the lower or "up" swage plate 300a and assembly while the "second" assembly refers herein to the upper or "down" swage plate 300b or assembly, where "up" and "down" is consistent with the description elsewhere herein.

Arm tip 333 comprises a first through-hole 333a through a first lateral side of the arm tip 333 coincident with the first lateral half of the main body 302a of the first offset swage plate 300a (e.g., coincident with swage through-hole 304a, as assembled) and the second lateral half of the main body 302b of the second offset swage plate 300b (e.g., coincident with clearance through-hole 308b, as assembled). Arm tip 333 further comprises a second through-hole 333b through a second lateral side of the arm tip 333 coincident with the second lateral half of the main body 302a of the first offset swage plate 300a (e.g., coincident with swage through-hole 304b, as assembled) and the first lateral half of the main body 302b of the second offset swage plate 300b (e.g., coincident with clearance through-hole 308a (FIG. 3C), as assembled).

Notably, and as can be seen in FIG. 3B, each of the swage plates 300a, 300b is configured in the assembly 310 in a position opposing the other and, therefore, the swage boss feature and the clearance hole feature alternate in position between the up and down facing assemblies. That is, swage plate 300a comprises main body 302a and swage through-hole 304a with corresponding swage boss 306a, and is facing upward (e.g., with its swage boss 306a extending upward) on one vertical side and one lateral side of the arm 332. In contrast, the other opposing swage plate 300b comprises main body 302b and swage through-hole 304b with corresponding swage boss 306b, and is facing downward (e.g., with its swage boss 306b extending downward) on the other opposing vertical side and opposing lateral side of the arm 332. Consequently, and as illustrated and described in more detail in reference to FIG. 3C, there is no swage boss buildup associated with swage boss 306a and swage boss 306b, such as described and illustrated in reference to use of the swage plate 200 of FIGS. 2A, 2B.

Figure 3C:
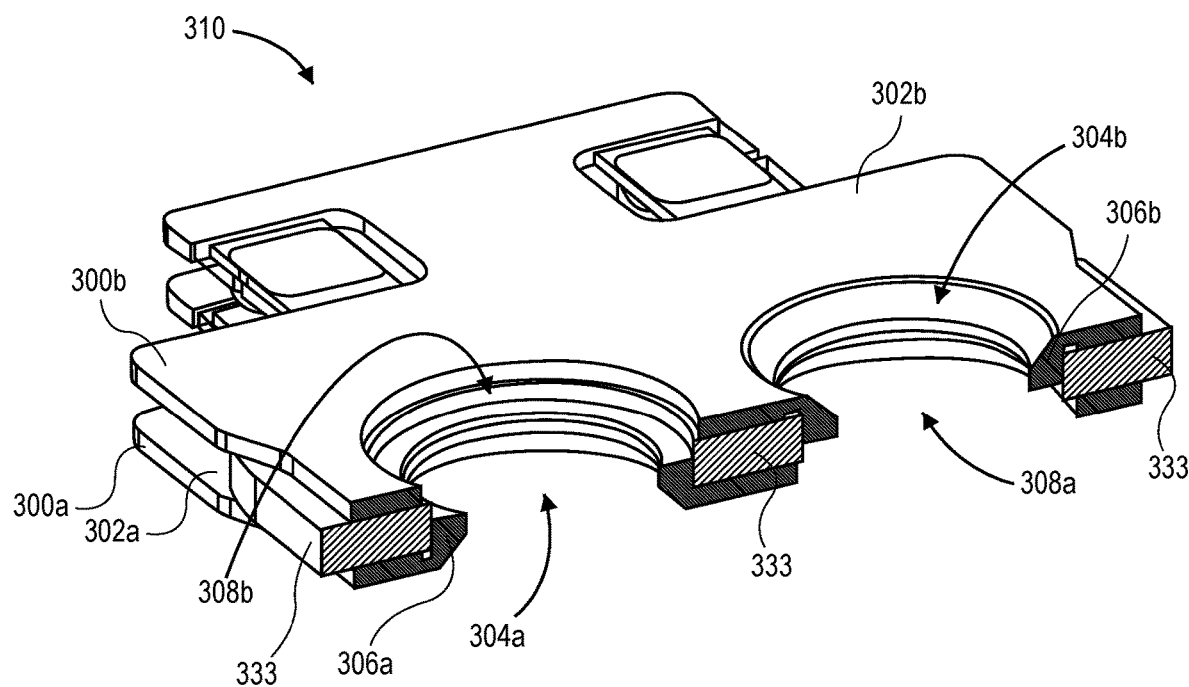
FIG. 3C is a cross-sectional proximal perspective view illustrating suspension-arm assembly swages utilizing the offset swage plate of FIG. 3A, according to an embodiment.

FIG. 3C is a cross-sectional proximal perspective view illustrating suspension-arm assembly swages utilizing the offset swage plate of FIG. 3A, according to an embodiment. As discussed, each swage plate 300a, 300b is configured in the assembly 310 in a position opposing the other. Thus, the swage boss 306a of swage plate 300a is facing upward and extends into a through-hole through one lateral side of the arm tip 333 of the arm 332 (FIG. 3B). The other opposing swage boss 306b of swage plate 300b is facing downward and extends into a through-hole through the other opposing lateral side of the arm tip 333 of the arm 332. Hence, swage boss 306a and swage boss 306b are positioned on different lateral sides or locations of the arm tip 333, such that there is no swage boss buildup associated with the swage bosses 306a, 306b, as they are not coaxial as with the swage plates 200 of FIGS. 2A, 2B. Furthermore, each clearance hole 308a, 308b provides swage ball clearance for the other suspension mounted to the opposite side. In view of the foregoing, the manufacturing dimensional clearance requirement represented as the distance d (FIG. 2B) between the stacked swage plates 200 (FIG. 2B) is no longer an issue, so the distance between the swage plates 300a, 300b, and likewise the distance D between the suspensions (e.g., suspensions 110c of FIG. 2B), is or can be reduced. With an optimized or a reduced thickness (z-height) suspension/arm assembly, such as with assembly 310, the corresponding recording disks can be positioned closer together and, therefore, more disks can be installed onto the disk spindle (e.g., spindle 124 of FIG. 1) of an HDD of a given z-height, such as within a standard form factor HDD.

Method of Assembling a Head Gimbal Assembly

FIG. 4 is a flow diagram illustrating a method of assembling a head gimbal assembly, according to an embodiment.

At block 402, swage-couple (or simply, swage) a first suspension to a first side of an actuator arm via a swage boss of a first offset swage plate, where the first offset swage plate comprises (a) a swage through-hole through a first lateral half of a planar main body, (b) the swage boss positioned around the perimeter of the swage through-hole and extending substantially normal to the main body, and (c) a clearance hole through an opposing second lateral half of the main body, the clearance hole having no swage boss. For example, the first lower suspension 110c (e.g., FIG. 2B) is swaged to the bottom side of the arm tip 333 (FIGS. 3B, 3C) of the actuator arm 332 (FIG. 3B) via swage boss 306a (FIGS. 3B, 3C) of the first offset swage plate 300a (FIGS. 3B, 3C), where the first offset swage plate 300a comprises (a) a swage through-hole 304a (FIGS. 3B, 3C) through a first lateral half of a planar main body 302a (FIGS. 3B, 3C), (b) the swage boss 306a positioned around the perimeter of the swage through-hole 304a and extending substantially normal to the main body 302a, and (c) a clearance hole 308a (FIG. 3A, 3C) through an opposing second lateral half of the main body 302a, the clearance hole 308a having no swage boss.

At block 404, swage-couple (or simply, swage) a second suspension to an opposing second side of the actuator arm via a swage boss of a second offset swage plate, where the second offset swage plate comprises (a) a swage through-hole through a first lateral half of a planar main body, (b) the swage boss positioned around the perimeter of the swage through-hole and extending substantially normal to the main body, and (c) a clearance hole through an opposing second lateral half of the main body, the clearance hole having no swage boss. For example, the second upper suspension 110c is swaged to the top side of the arm tip 333 of the actuator arm 332 via swage boss 306b of the second offset swage plate 300b, where the second offset swage plate 300b comprises (a) a swage through-hole 304b through a first lateral half of a planar main body 302b, (b) the swage boss 306b positioned around the perimeter of the swage through-hole 304b and extending substantially normal to the main body 302b, and (c) a clearance hole 308b through an opposing second lateral half of the main body 302b, the clearance hole 308b having no swage boss.

Thus, a relatively thin arm tip design is enabled without the issue of the swage boss back-to-back clearance or buildup, and a reduced height suspension/arm assembly of an HGA is produced, thereby increasing the overall space clearance between the HGA and media and inhibiting a detrimental operational shock event.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A head stack assembly (HSA) comprising:
an arm;
a first offset swage plate coupling a first suspension to and extending in a longitudinal direction from a first side of the arm; and
a second offset swage plate coupling a second suspension to and extending in the longitudinal direction from an opposing second side of the arm;
wherein each of the first and second offset swage plates, having a lateral direction normal to the longitudinal direction, comprises:
a planar main body,
a first through-hole through a first lateral half of the main body, the first through-hole comprising a swage boss around the perimeter of the first through-hole and extending substantially normal to the main body, and
a second through-hole through an opposing second lateral half of the main body, the second through-hole having no swage boss.

2. The HSA of claim 1, wherein the arm comprises:
an arm tip,
a first through-hole through a first lateral side of the arm tip coincident with the first lateral half of the main body of the first offset swage plate and the second lateral half of the main body of the second offset swage plate, and
a second through-hole through a second lateral side of the arm tip coincident with the second lateral half of the main body of the first offset swage plate and the first lateral half of the main body of the second offset swage plate.

3. The HSA of claim 2, wherein:
the first suspension is swage-coupled to the first side of the arm via the swage boss of the first offset swage plate; and
the second suspension is swage-coupled to the second side of the arm via the swage boss of the second offset swage plate.

4. A hard disk drive (HDD) comprising:
a plurality of disk media rotatably mounted on a spindle;
a first head slider housing a first read-write transducer configured to read from and to write to a first disk medium of the plurality of disk media;
a second head slider housing a second read-write transducer configured to read from and to write to a second disk medium of the plurality of disk media;
a voice coil actuator configured to move the first head slider and the second head slider to access portions of the respective first disk medium and second disk medium; and
a head stack assembly (HSA) coupled with the voice coil actuator, the HSA comprising:
an actuator arm,
a first offset swage plate coupling a first suspension housing the first head slider to and extending in a longitudinal direction from a first side of the actuator arm, and
a second offset swage plate coupling a second suspension housing the second head slider to and extending in the longitudinal direction from an opposing second side of the actuator arm;
wherein each of the first and second offset swage plates, having a lateral direction normal to the longitudinal direction, comprises:
a planar main body,
a swage through-hole through a first lateral side of the main body, the swage through-hole comprising a swage boss around the perimeter of the swage through-hole and extending substantially normal to the main body, and
a clearance hole through an opposing second lateral side of the main body, the clearance hole void of a swage boss.

5. The HDD of claim 4, wherein the actuator arm comprises:
an arm tip at a distal end,
a first through-hole through a first lateral side of the arm tip coincident with the first lateral side of the main body of the first offset swage plate and the second lateral side of the main body of the second offset swage plate, and a second through-hole through a second lateral side of the arm tip coincident with the second lateral side of the main body of the first offset swage plate and the first lateral side of the main body of the second offset swage plate.

6. The HDD of claim 4, wherein:
the first suspension is swage-coupled to the first side of the actuator arm via the swage boss of the first offset swage plate; and
the second suspension is swage-coupled to the second side of the actuator arm via the swage boss of the second offset swage plate.

7. The HDD of claim 4, wherein the HSA is configured for positioning between the first disk medium and the second disk medium.

8. A method of assembling a head stack assembly (HSA), the method comprising:
swage-coupling a first suspension to and extending in a longitudinal direction from a first side of an actuator arm via a swage boss of a first offset swage plate; and
swage-coupling a second suspension to and extending in the longitudinal direction from an opposing second side of the actuator arm via a swage boss of a second offset swage plate;
wherein each of the first and the second offset swage plates, having a lateral direction normal to the longitudinal direction, comprises:
a planar main body,
a swage through-hole through a first lateral half of the main body, wherein the swage boss is positioned around the perimeter of the swage through-hole and extending substantially normal to the main body, and
a clearance hole through an opposing second lateral half of the main body, the clearance hole void of a swage boss.

9. The method of claim 8, wherein swage-coupling the first suspension to the first side of the actuator arm and swage-coupling the second suspension to the second side of the actuator arm include swage-coupling to the actuator arm comprising:
an arm tip;
a first through-hole through a first lateral side of the arm tip coincident with the first lateral half of the main body of the first offset swage plate and the second lateral half of the main body of the second offset swage plate; and
a second through-hole through a second lateral side of the arm tip coincident with the second lateral half of the main body of the first offset swage plate and the first lateral half of the main body of the second offset swage plate.

10. A system comprising:
means for swage-coupling a first suspension to and extending in a longitudinal direction from a first side of an actuator arm via a first lateral side, in a direction normal to the longitudinal direction, of a first offset swage plate; and
means for swage-coupling a second suspension to and extending in the longitudinal direction from an opposing second side of the actuator arm via an opposing second lateral side of a second offset swage plate.

11. A head gimbal assembly (HGA) comprising:
an offset swage plate; and
a suspension coupled with and extending in a longitudinal direction from the offset swage plate;
wherein the offset swage plate has a lateral direction normal to the longitudinal direction and comprises:
a planar main body,
a first through-hole through a first lateral half of the main body, the first through-hole comprising a swage boss around the perimeter of the first through-hole and extending substantially normal to the main body, and
a second through-hole through an opposing second lateral half of the main body, the second through-hole having no swage boss.

12. The HGA of claim 11, further comprising:
a head slider housing a read-write transducer and coupled to the suspension.

* * * * *